US009304785B2

(12) United States Patent
Canu et al.

(10) Patent No.: US 9,304,785 B2
(45) Date of Patent: Apr. 5, 2016

(54) LOCALIZING A SOFTWARE PRODUCT

(75) Inventors: Marco Canu, Rome (IT); Sandro Piccinini, Campano (IT); Luigi Pichetti, Monreale (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1925 days.

(21) Appl. No.: 12/473,924

(22) Filed: May 28, 2009

(65) Prior Publication Data

US 2009/0299726 A1 Dec. 3, 2009

(30) Foreign Application Priority Data

Jun. 2, 2008 (EP) ..................................... 08157388

(51) Int. Cl.
*G06F 17/20* (2006.01)
*G06F 9/44* (2006.01)
*G06F 17/28* (2006.01)
*G06Q 10/10* (2012.01)
*G06Q 30/02* (2012.01)
*G06Q 30/06* (2012.01)

(52) U.S. Cl.
CPC ............ *G06F 9/4448* (2013.01); *G06F 17/289* (2013.01); *G06Q 10/10* (2013.01); *G06Q 30/02* (2013.01); *G06Q 30/0283* (2013.01); *G06Q 30/0601* (2013.01)

(58) Field of Classification Search
CPC .... G06F 9/4448; G06F 17/289; G06F 17/275
USPC .................... 704/8, 9; 715/256, 264, 265, 762
See application file for complete search history.

(56) References Cited

U.S. PATENT DOCUMENTS 6,035,121 A * 3/2000 Chiu et al. .................... 717/141
6,490,547 B1 * 12/2002 Atkin et al. ....................... 704/8
6,938,007 B1 * 8/2005 Iulianello et al. .............. 705/34
7,171,348 B2 * 1/2007 Scanlan ........................... 704/2

(Continued)

OTHER PUBLICATIONS

Tractinsky, Noam, "A Theoretical Framework and Empirical Examination of the Effects of Foreign and Translated Interface Language", http://www.informaworld.com/smpp/content~content=a718868226~db=all, Behavior and Information Technology, vol. 19, pp. 1-13, Issue 1, Published in 2000, pp. 14.

(Continued)

*Primary Examiner* — Paras D Shah
(74) *Attorney, Agent, or Firm* — Yee & Associates, P.C.; Joseph Petrokaitis

(57) ABSTRACT

Localizing a software product is improved. A plurality of attributes of a plurality of interface elements according to a specified type of user interface are retrieved. Responsive to user input, one or more countries in which the software product is to be localized are specified. An interface element for the user interface is selected. From the attributes of the selected interface element, it is determined whether the interface element is consistent with the specified countries. If not, an alert on a computer display is displayed, in the event the selected interface element is not consistent with the countries specified by the user. The invention also calculates a cost of localizing the selected interface element, wherein the projected cost of localizing the user interface is incremented with the cost of localizing the selected interface element. An alert for the projected cost of localizing the user interface is displayed on the computer display.

17 Claims, 3 Drawing Sheets

(56) References Cited

U.S. PATENT DOCUMENTS

| | | | |
|---|---|---|---|
| 7,257,775 B1* | 8/2007 | Jivakov et al. | 715/742 |
| 7,653,529 B2* | 1/2010 | Litster et al. | 704/8 |
| 7,788,648 B2* | 8/2010 | Bossom et al. | 717/136 |
| 7,801,912 B2* | 9/2010 | Ransil et al. | 707/770 |
| 7,856,424 B2* | 12/2010 | Cisler et al. | 707/654 |
| 2002/0116172 A1* | 8/2002 | Vargas | 704/8 |
| 2002/0162093 A1* | 10/2002 | Zhou et al. | 717/130 |
| 2003/0084401 A1* | 5/2003 | Abel et al. | 715/501.1 |
| 2003/0140316 A1* | 7/2003 | Lakritz | 715/536 |
| 2004/0049374 A1* | 3/2004 | Breslau et al. | 704/2 |
| 2004/0167768 A1 | 8/2004 | Travieso et al. | |
| 2006/0294463 A1* | 12/2006 | Chu et al. | 715/703 |
| 2007/0061789 A1* | 3/2007 | Kaneko et al. | 717/140 |
| 2007/0244691 A1* | 10/2007 | Alwan et al. | 704/8 |
| 2008/0127045 A1* | 5/2008 | Pratt et al. | 717/104 |
| 2008/0209356 A1* | 8/2008 | Grechanik et al. | 715/769 |
| 2009/0094609 A1* | 4/2009 | Burukhin et al. | 718/104 |
| 2009/0113445 A1* | 4/2009 | Sakashita et al. | 719/313 |
| 2009/0217100 A1* | 8/2009 | Grechanik et al. | 714/38 |
| 2009/0241115 A1* | 9/2009 | Raffo et al. | 718/100 |

OTHER PUBLICATIONS

SimulTrans, Localization Return-on-Investment, Part I, http://www.simultrans.com/articledetail.cfm?PostingID=27, [retrieved from internet on Mar. 3, 2008], Copyright 2005, pp. 1-10.

* cited by examiner

TEXT FIELD WIDGET

| Element | Translation | Locals compatibility list |
|---|---|---|
| Label | YES | All |
| Tooltip | YES | All |
| Access key | YES | All |
| Visual element | NO | All |

*Fig. 1*

LOCALIZING A SOFTWARE PRODUCT

TECHNICAL FIELD

The present invention relates to a method, system and computer program for estimating the cost of localizing a software product.

BACKGROUND

The global nature of the web and the growing acceptance of electronic commerce have been instrumental in helping companies reach ever-wider markets. However, as their markets expand, it is becoming increasingly important for businesses to ensure that their products comply with local languages and customs.

Localization refers to the process of adapting a global product for the language and customs of a particular country. The localization of a software product embraces three components, namely, its graphical user interface (GUI), its online help system and its supporting documentation. A GUI typically comprises the menus, dialogue boxes, error messages, etc. that a user sees when using the software product. However, in practice, usually only a small portion of a GUI needs to be translated during localization (e.g., the text displayed in menus and dialogue boxes or error message boxes). In contrast, most of the content of an online help file must be translated (apart from hyperlinks etc). Supporting documentation includes user manuals, read_me files etc., wherein user manuals are usually highly formatted documents that must reach the target users and read_me files usually contain set-up information or additions to the user manuals. Normally, both forms of documentation must be almost entirely translated during localization. Localization also encompasses other issues apart from translation. For example, in the case of Arabic localization, some of the graphical elements (e.g., text fields or selection lists) in a GUI may not comply with Arabic textual rules (i.e. Arabic text is typically written from right to left rather than the Western approach of writing from left to right).

In view of the broad range of translatable components in a software product, localization costs can range from $50,000 to half a million dollars per language. This is clearly a significant expenditure for any product or marketing budget. Thus, before embarking on localization, it is necessary to calculate localization costs and expected revenue from a localized product to determine whether localization is, in fact, economically justifiable. Apart from purely financial considerations, it is worth bearing in mind that translation can take a considerable amount of time, which must be taken in account when planning a software development project. Thus, a project manager also needs an indication of the required time frame for localizing a particular design.

Furthermore, a project manager often has to calculate localization costs several times during a product development life-cycle, when, for example, the project manager receives product change requests from different stakeholders. In this case, the impact of the requested changes on the localization cost and time frame must be carefully evaluated.

In order to calculate the likely cost and time frame for localizing a software product, it is necessary to obtain a precise and reliable analysis of the quantity and the type of text to be translated therein. However, whilst there are a number of automatic tools currently available for calculating the localization cost for rendering GUI panels, there are, at present, no tools available for accurately and automatically determining the overall cost of localizing a software application. Thus, in the absence of such tools, project managers must use their own personal techniques for performing these calculations, a process which is both time-consuming and imprecise.

Furthermore, the process of designing a GUI is normally completely decoupled from that of determining localization costs. In particular, developers typically design their own GUIs (using for example Microsoft Visio®) and subsequently write the code therefore. It is only when the overall software product has been fully developed, that a resource file (containing the words to be translated) is created and a separate application used to count the words therein.

US Patent Application No. US20040167768 describes a parser that parses web pages in order to count the translatable words therein. However, the parser described in US20040167768 focuses on assessing web pages that have already been developed. This provides no assistance to a project-manager in making design decisions during the development phase of a software product.

SUMMARY

The invention provides a method, system and product for localizing a software product. A plurality of attributes of a plurality of interface elements according to a specified type of user interface are retrieved. Responsive to user input, one or more countries in which the software product is to be localized are specified. An interface element for the user interface is selected. From the attributes of the selected interface element, it is determined whether the interface element is consistent with the specified countries. If not, an alert on a computer display is displayed, in the event the selected interface element is not consistent with the countries specified by the user. The invention also calculates a cost of localizing the selected interface element, wherein the projected cost of localizing the user interface is incremented with the cost of localizing the selected interface element. An alert for the projected cost of localizing the user interface is displayed on the computer display.

BRIEF DESCRIPTION OF THE SEVERAL VIEWS OF THE DRAWINGS

An embodiment of the invention is herein described by way of example only, with reference to the accompanying Figures in which:

FIG. 1 is a table of an exemplary profile of a GUI element; and

DETAILED DESCRIPTION

Figure 2:
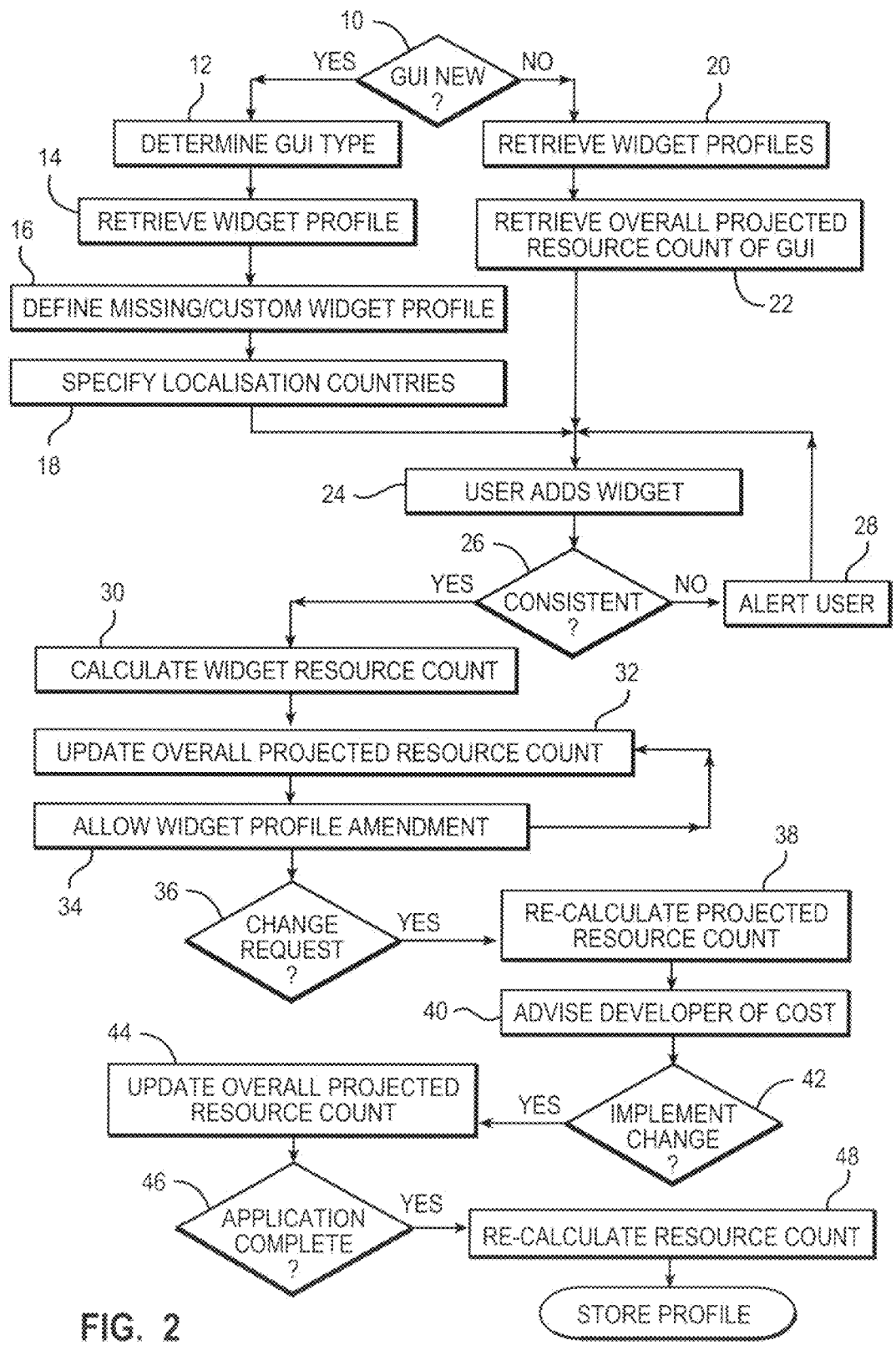
FIG. 2 is a flow-chart of the method of the preferred embodiment.

For simplicity and clarity, individual elements (e.g., Header, Text Field, Drop Down list, Checkbox, Radio Button, Table, Tree or Message etc.) in a GUI will be known henceforth as "widgets". As discussed above, localization costs are dependent on inter alia the number of words and nature of words/text, etc. (e.g., Arabic/Chinese characters etc.) to be converted. Thus, for simplicity, the features of a GUI having an impact on its localization cost will henceforth be generically known as "resources". Similarly, the number of these features in a GUI will be known henceforth as the GUI's "resource count".

Central to the present invention is the direct association of each widget in a GUI with a profile listing the widget's attributes. Take, for example, a text field having a label associated with a fly-over (i.e. text shown when a mouse is passed over the text field). Referring to FIG. 1, the text field's profile may comprise attributes such as the maximum and minimum limits on the label, the length of the flyover text, and the countries with whose languages and customs the label and flyover text comply. While the present invention provides the attributes with default values, the user may alter these values. For example, the user can set the profile of the above-mentioned text field to indicate that the text field is compliant with the languages and customs of all countries apart from Arabic countries and China.

The specific association of a profile with a widget, enables each widget to be uniquely identified, this in turn provides a simple, reliable and controllable mechanism for calculating and updating the overall resource requirements of a GUI. More particularly, the developer is provided with a real-time evaluation of the resource cost incurred by the addition of each new widget to a GUI. The unique identification of a widget by its profile also prevents text in a widget that appears in several panels of a GUI from being repeatedly counted when estimating the overall localization requirements of a software application.

When assessing localization costs, it is important to know the nature of the text to be translated. In particular, since help files typically comprises text including complete sentences, they are usually more easily translated than labels whose meaning depends on the context in which they are used. For example, the translation of the label of "Group by" differs according to whether "Group by" refers to a main name, product name etc. To overcome this problem, the present invention includes additional information about each widget in its associated profile. In particular, the present invention provides contextual information about text to be translated, indicating the kind of widget in which it appears (e.g., the "Group by" label is the header for a table). Using this information, the present invention can provide an itemised summary of the resource counts of the different types of widgets in a GUI (e.g., the word count of labels, messages, help text etc.). Similarly, since widgets in web GUIs or standalone java GUIs may have different resource counts, the preferred embodiment includes an indication of a widget's context in its profile.

The preferred embodiment enables a profile to be retrieved from an archive of widgets and their profiles. Alternatively, the preferred embodiment allows a user to customise or design a profile a widget. Similarly, the preferred embodiment includes a mechanism for retrieving a widget's profile from a web service and updating the preferred embodiment's own archive of profiles with the retrieved profile.

The preferred embodiment also provides an interactive facility for warning the developer of potential problems with a GUI and enabling the developer to take remedial steps to correct the problem. For example, if a developer has specified a list of countries in which a software application is to be sold, the preferred embodiment can alert the user if a widget in a GUI (or a built panel) of the software application does not comply with the languages or customs of any of the countries specified by the developer. Similarly, the preferred embodiment can alert the user if a change to the widget changes the PII estimate beyond a pre-defined threshold.

The preferred embodiment also provides a mechanism for updating a widget's profile and using the updated widget profiles to update the overall projected resource count of the software application.

Similarly, the preferred embodiment includes a recalculation mechanism which on receipt of a request for changes to the design of a GUI, re-calculates the overall projected resource count of the changed GUI and advises the project-manager of the cost of implementing the requested change to the GUI and identifies the files that must be re-translated to accommodate the request.

In a first form, a preferred embodiment is a complete stand-alone software application which:
enables a planned rendering of a GUI to be built therein;
completely manages the process of ensuring the GUI's compliance with the local requirements of its target markets; and
provides a detailed estimate of the cost of localizing the GUI.

In another form, a preferred embodiment is a plug-in, which (during the design phase of a software application) can be integrated into an existing modelling package (e.g., Microsoft®Visio®) for the GUI.

Referring to FIG. 2, in use, the method of the preferred embodiment checks 10 whether a GUI opened by a user is a new GUI or an existing work in progress. If the GUI is new, the preferred embodiment requests 12 the user to specify the type of GUI (i.e. web or java or others). Using this information, the preferred embodiment retrieves 14 (from a first database) a library of widget profiles appropriate to the GUI type specified by the user. The preferred embodiment also allows the user to define 16 profiles for widgets that do not currently have a profile or for custom widgets not present in the retrieved library. The preferred embodiment then allows the user to specify 18 the countries in which the new GUI is to be localized. In the event the GUI opened by the user is an existing work in progress, the preferred embodiment simply retrieves 20 an appropriate library of widget profiles for the GUI. The preferred embodiment also retrieves 22 the current overall projected resource count of the GUI.

The preferred embodiment allows a user to add 24 a widget to the GUI, by selecting the required widget from the retrieved library (or a custom designed widget) the preferred embodiment. The preferred embodiment then checks 26 the profile of the selected widget to determine if it is consistent with the countries of localization previously specified by the user. In the event the selected widget is not consistent with the countries specified by the user, the preferred embodiment issues 28 an alert to the user and allows the user 24 to select another widget.

In the event the selected widget is consistent with the countries specified by the user, the preferred embodiment uses the data in the widget's profile to calculate 30 the widget's resource count. The widget's resource count is added to an existing overall projected resource count for the GUI (which includes the resource counts of any previously included widgets to the GUI) to thereby update 32 the GUI's overall projected resource count. Thus, each addition of a widget to the GUI progressively increases the overall projected resource count of the GUI.

The preferred embodiment also allows the user to amend 34 the widget's profile. In which case, the overall projected resource count for the GUI is updated 32 accordingly. On receipt 36 of a request for changes to the design of a GUI, the preferred embodiment re-calculates 38 the overall projected resource count of the changed GUI and advises 40 the project-manager of the cost of implementing the requested change to the GUI. The preferred embodiment also identifies the files that must be re-translated to accommodate the requested change. In the event the project manager decides to implement the requested change, the preferred embodiment updates 44 the overall projected resource count of the GUI to reflect the changes made thereto.

Finally, once all the translation tasks are completed and all the resources bundle are released, the preferred embodiment recalculates 48 the overall resource count of the application and provides a report to the developer. The overall resource count in this case is not a projected overall resource count. Instead, it is a precise count of the words that were translated in the final software application. Thus, for the sake of clarity and brevity, this resource count will be known as a "real overall resource count" (to distinguish it from the projected overall resource counts calculated as the software application is developed). The preferred embodiment then updates 50 the GUI profile (defined at the start of the product development) with the real overall resource count, so that the updated profile can be used for the next release of the product.

Figure 3:
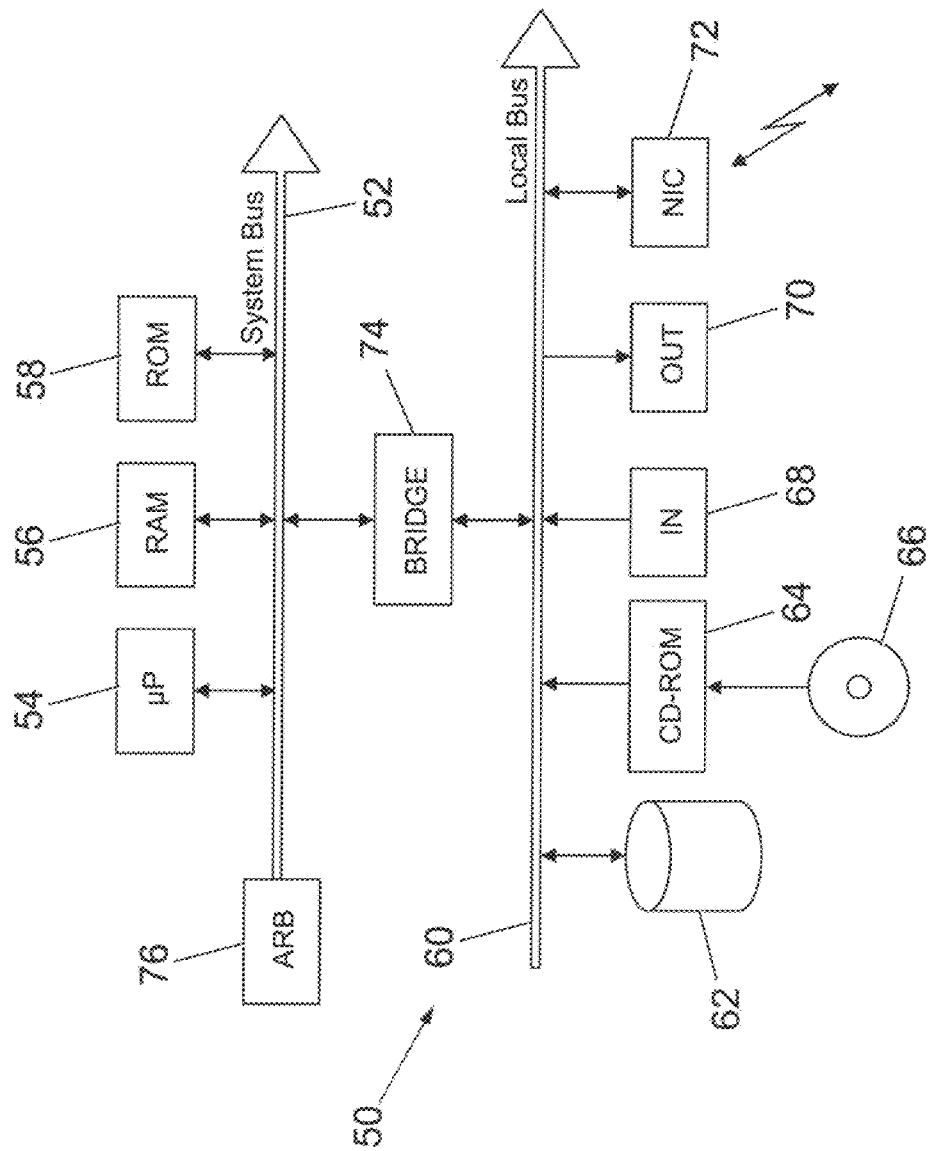
FIG. 3 is a block diagram of a computer system configured to allow the method the preferred embodiment to be operated thereon.

Referring to FIG. 3, a generic computer system 50 adapted to support the preferred embodiments is formed by several units that are connected in parallel to a system bus 52. In detail, one or more microprocessors (XP) 54 control operation of the computer 50; a RAM 56 is directly used as a working memory by the microprocessors 54, and a ROM 58 stores basic code for a bootstrap of the computer 50. Peripheral units are clustered around a local bus 60 (by means of respective interfaces). Particularly, a mass memory consists of a hard-disk 62 and a drive 64 for reading CD-ROMs 66. Moreover, the computer 50 includes input devices 68 (for example, a keyboard and a mouse), and output devices 70 (for example, a monitor and a printer). A Network Interface Card (NIC) 72 is used to connect the computer 50 to the network. A bridge unit 74 interfaces the system bus 52 with the local bus 60. Each microprocessor 54 and the bridge unit 74 can operate as master agents requesting an access to the system bus 52 for transmitting information. An arbiter 76 manages the granting of the access with mutual exclusion to the system bus 52.

Similar considerations apply if the system has a different topology, or it is based on other networks. Alternatively, the computers have a different structure, including equivalent units, or consist of other data processing entities (such as PDAs, mobile phones and the like).

Alterations and modifications may be made to the above without departing from the scope of the invention.

What is claimed is:

1. A method for localizing a software product during development of the software product, the method comprising:
    retrieving a plurality of attributes of a plurality of interface elements according to a specified type of user interface;
    responsive to user input, specifying one or more countries in which the software product is to be localized;
    responsive to user input during development of the software product, selecting an interface element for the user interface;
    responsive to selecting the interface element for the user interface during development of the software product, determining from the attributes of the selected interface element whether the interface element is consistent with the specified countries, wherein the attributes of the selected interface element are maintained in a profile that specifies countries whose languages comply with the selected interface element;
    displaying an alert on a computer display, in the event the selected interface element is not consistent with the countries specified by the user;
    calculating a cost of localizing the selected interface element;
    incrementing a projected cost of localizing the user interface with the cost of localizing the selected interface element; and
    displaying an alert for the projected cost of localizing the user interface.

2. The method as claimed in claim 1, wherein the user interface was developed by a first user and the method further comprises:
    receiving a request for a change to the user interface from a second user;
    recalculating the projected cost of localizing the user interface including the requested change;
    alerting the first user of any changes to the projected cost of localizing the user interface incurred by accommodating the requested change;
    identifying files that must be re-translated to accommodate the requested change;
    presenting the first user a selection to choose whether to implement the requested change based on the changes to the projected cost of localizing the user interface; and
    responsive to user selection of the requested change, updating the projected cost of localizing the user interface to reflect the implementation of the requested change.

3. The method as claimed in claim 1 wherein the method further comprises presenting a user interface to amend the attributes of a selected interface element during development of the software product.

4. The method as claimed in claim 1 wherein retrieving a plurality of attributes of a plurality of interface elements comprises retrieving the plurality of attributes from a repository of attributes stored in a computer memory.

5. The method as claimed in claim 1 wherein retrieving a plurality of attributes of a plurality of interface elements comprises allowing a first user to develop additional interface elements and customize the attributes thereof.

6. The method as claimed in claim 1 wherein retrieving a plurality of attributes of a plurality of interface elements according to the specified type of user interface retrieves the plurality of attributes from a web-service.

7. The method as claimed in claim 1 further comprises presenting a selection whether the user interface is one selected from the set comprising a web user interface and a Java user interface.

8. The method as claimed in claim 1, wherein calculating a cost of localizing the selected interface element comprises estimating a number of words requiring translation in the selected interface element.

9. The method as claimed in claim 1 wherein the method comprises the further step of determining a final cost of localising the software product when it is substantially completely developed.

10. The method as claimed in claim 1 further comprising:
    determining whether the user interface is new or an existing work in progress;
    responsive to a determination that the user interface is an existing work, obtaining a plurality of attributes of a plurality of interface elements typically used in the existing user interface; and
    responsive to a determination that the user interface is an existing work, obtaining the projected cost of localizing the user interface.

11. A system for localizing a software product during development of the software product, comprising:
    a processor;
    a computer memory for storing instructions;
    a computer display for displaying results of stored instructions when executed by the processor;

computer instructions stored in the computer memory which when executed by the processor perform a method comprising:

retrieving a plurality of attributes of a plurality of interface elements according to a specified type of user interface;

responsive to user input, specifying one or more countries in which the software product is to be localized;

responsive to user input during development of the software product, selecting an interface element for the user interface;

responsive to selecting the interface element for the user interface during development of the software product, determining from the attributes of the selected interface element whether the interface element is consistent with the specified countries, wherein the attributes of the selected interface element are maintained in a profile that specifies countries whose languages comply with the selected interface element;

displaying an alert on the computer display, in the event the selected interface element is not consistent with the countries specified by the user;

calculating a cost of localizing the selected interface element;

incrementing a projected cost of localizing the user interface with the cost of localizing the selected interface element; and displaying an alert for the projected cost of localizing the user interface.

12. A computer program product comprising a non-transitory machine readable storage medium having program code stored thereon for localizing a software product during development of the software product, the program code comprising instructions which when executed by a processor perform a method comprising:

retrieving a plurality of attributes of a plurality of interface elements according to a specified type of user interface;

responsive to user input, specifying one or more countries in which the software product is to be localized;

responsive to user input during development of the software product, selecting an interface element for the user interface;

responsive to selecting the interface element for the user interface during development of the software product, determining from the attributes of the selected interface element whether the interface element is consistent with the specified countries, wherein the attributes of the selected interface element are maintained in a profile that specifies countries whose languages comply with the selected interface element;

displaying an alert on a computer display, in the event the selected interface element is not consistent with the countries specified by the user;

calculating a cost of localizing the selected interface element;

incrementing a projected cost of localizing the user interface with the cost of localizing the selected interface element; and displaying an alert for the projected cost of localizing the user interface.

13. The computer program product as claimed in claim 12 further comprising instructions for:

receiving a request for a change to the user interface from a second user;

recalculating the projected cost of localizing the user interface including the requested change;

alerting a first user of any changes to the projected cost of localizing the user interface incurred by accommodating the requested change;

identifying files that must be re-translated to accommodate the requested change;

presenting the first user a selection to choose whether to implement the requested change based on the changes to the projected cost of localizing the user interface; and responsive to user selection of the requested change, updating the projected cost of localizing the user interface to reflect the implementation of the requested change.

14. The computer program product as claimed in claim 12, wherein the computer program product is a plug-in module for an existing modeling software product.

15. The computer program product as claimed in claim 12 wherein the method further comprises presenting a user interface to amend the attributes of a selected interface element during development of the software product.

16. The computer program product as claimed in claim 12 wherein the plurality of attributes of a plurality of interface elements is retrieved from a web-service.

17. The computer program product as claimed in claim 12 wherein the method further comprises:

determining whether the user interface is new or an existing work in progress;

responsive to a determination that the user interface is an existing work, obtaining a plurality of attributes of a plurality of interface elements typically used in the existing user interface; and responsive to a determination that the user interface is an existing work, obtaining the projected cost of localizing the user interface.

\* \* \* \* \*